United States Patent
Hamada (10) Patent No.: US 9,815,426 B2
(45) Date of Patent: Nov. 14, 2017

(54) SEAT BACK PANEL FOR VEHICLE

(71) Applicant: Nissan Motor Co., Ltd., Kanagawa (JP)

(72) Inventor: Yukihiro Hamada, Kanagawa (JP)

(73) Assignee: NISSAN MOTOR CO., LTD., Kanagawa (JP)

(*) Notice: Subject to any disclaimer, the term of this patent is extended or adjusted under 35 U.S.C. 154(b) by 0 days.

(21) Appl. No.: 15/311,871

(22) PCT Filed: May 21, 2014

(86) PCT No.: PCT/JP2014/063493
§ 371 (c)(1),
(2) Date: Nov. 17, 2016

(87) PCT Pub. No.: WO2015/177889
PCT Pub. Date: Nov. 26, 2015

(65) Prior Publication Data
US 2017/0080889 A1    Mar. 23, 2017

(51) Int. Cl.
*B60R 21/00*    (2006.01)
*B60R 21/02*    (2006.01)
(Continued)

(52) U.S. Cl.
CPC .............. *B60R 21/026* (2013.01); *B60N 2/64* (2013.01); *B60N 2/686* (2013.01); *B60R 5/006* (2013.01);
(Continued)

(58) Field of Classification Search
CPC ......... B60R 5/04; B60R 5/006; B60R 21/026; B60R 13/01; B60N 2/22; B60N 2/64; B60N 6/686; B60N 5/006
(Continued)

(56) References Cited

U.S. PATENT DOCUMENTS 7,611,184 B1 * 11/2009 Bisson ............... B60R 5/006
                                        296/37.15
9,463,747 B2 * 10/2016 Chen ................... B60N 2/22
(Continued)

FOREIGN PATENT DOCUMENTS

JP    S60-130184 U    8/1985
JP    H01-314643 A    12/1989
(Continued)

OTHER PUBLICATIONS

International Preliminary Report on Patentability for corresponding International Application No. PCT/JP2014/063493, dated Nov. 24, 2016 (13 pages).

*Primary Examiner* — Joseph D Pape
(74) *Attorney, Agent, or Firm* — Osha Liang LLP (57) ABSTRACT

A seat back panel for a vehicle has a plate-shaped main body disposed between a vehicle compartment and a trunk, and having a first plate member disposed on a vehicle compartment side of the vehicle, and a second plate member disposed on a trunk side while facing the first plate member and a fiber assembly having a plurality of fibers housed between the first plate member and the second plate member. An opening portion which establishes communication between the vehicle compartment and the trunk is formed in the plate-shaped main body. The fiber assembly is disposed along a peripheral edge portion of the opening portion. A space is provided between the first plate member and the second plate member. An intermediate member is interposed in the space.

4 Claims, 8 Drawing Sheets

(51) Int. Cl.
  *B60R 5/04*   (2006.01)
  *B60N 2/68*   (2006.01)
  *B60R 5/00*   (2006.01)
  *B60R 13/01*  (2006.01)
  *B60N 2/64*   (2006.01)

(52) U.S. Cl.
  CPC ............... *B60R 5/04* (2013.01); *B60R 13/01* (2013.01); *B60Y 2306/01* (2013.01)

(58) Field of Classification Search
  USPC ................................. 296/37.16, 37.1, 37.8
  See application file for complete search history.

(56) References Cited

U.S. PATENT DOCUMENTS

| | | |
|---|---|---|
| 2011/0140480 A1 | 6/2011 | Nakamura et al. |
| 2013/0147234 A1 | 6/2013 | Nakamura et al. |
| 2015/0232010 A1 | 8/2015 | Sato et al. |

FOREIGN PATENT DOCUMENTS

| | | |
|---|---|---|
| JP | H05-60343 U | 8/1993 |
| JP | H07-11316 U | 2/1995 |
| JP | 2010-089658 A | 4/2010 |
| JP | 2011-121550 A | 6/2011 |
| JP | 2014-019407 A | 2/2014 |

* cited by examiner

SEAT BACK PANEL FOR VEHICLE

BACKGROUND

Technical Field

The present invention relates to a seat back panel for a vehicle.

Related Art

Conventionally, a seat back panel for a vehicle which is provided between a vehicle compartment and a trunk has been publicly known (for example, see Patent Literature 1). As in Patent Literature 1, some seat back panels for a vehicle have an opening portion for a pass-through to a trunk which enables communication between a vehicle compartment and the trunk.

Patent Literature 1: Japanese Patent Application Publication No. 2010-89658

SUMMARY

If baggage loaded onto a trunk moves and collides with a seat back panel when, for example, a vehicle stops, damage may occur from a peripheral edge portion of an opening portion of the seat back panel due to the impact load.

A seat back panel for a vehicle according to one or more embodiments of the present invention is capable of suppressing the occurrence of damage due to an impact load, even when the seat back panel for a vehicle has an opening portion.

A seat back panel for a vehicle according to one or more embodiments of the present invention includes a plate-shaped main body and a fiber assembly. The plate-shaped main body includes a first plate member and a second plate member. The fiber assembly is housed between the first plate member and the second plate member, and is formed of multiple fibers. An opening portion is formed in the plate-shaped main body, and the fiber assembly is disposed along a peripheral edge portion of the opening portion.

According to the seat back panel for a vehicle according to one or more embodiments of the present invention, the fiber assembly is disposed along the peripheral edge portion of the opening portion of the seat back panel. For this reason, the strength of the peripheral edge portion of the opening portion in the seat back panel is enhanced, and the strength of the entire seat back panel is also enhanced. Thus, when an impact load is inputted to the seat back panel, breakage having the origin at the peripheral edge portion of the opening portion is suppressed.

DETAILED DESCRIPTION

Hereinbelow, embodiments of the present invention will be described based on the drawings. Note that in the following description, the vehicle front side is denoted by FR, the vehicle rear side by RR, the right side in a vehicle width direction by RH, the left side in the vehicle width direction by LH, the vehicle upper side by UPR, and the vehicle lower side by LWR. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
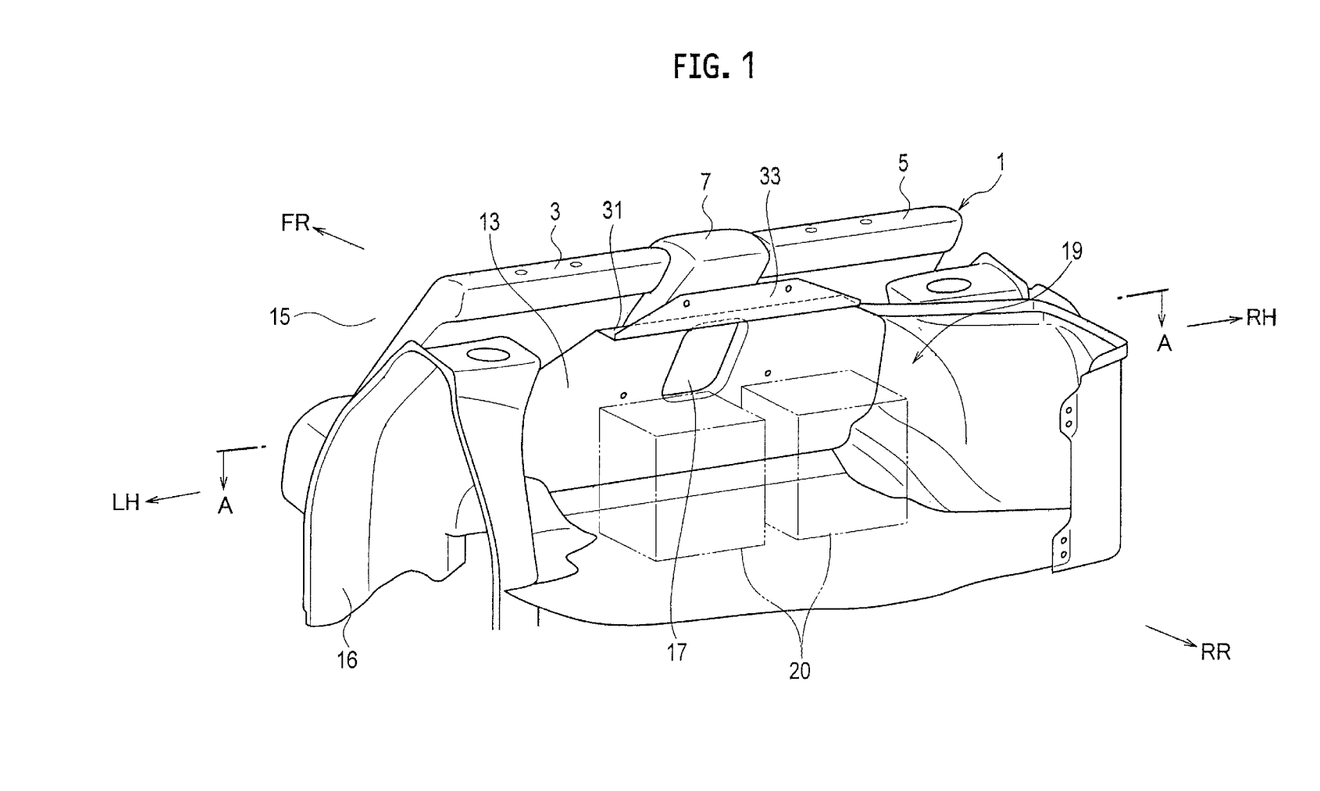
FIG. 1 is a perspective view illustrating a vicinity of a seat back panel according to a first embodiment of the present invention, when viewed obliquely from a rear side.
Figure 2:
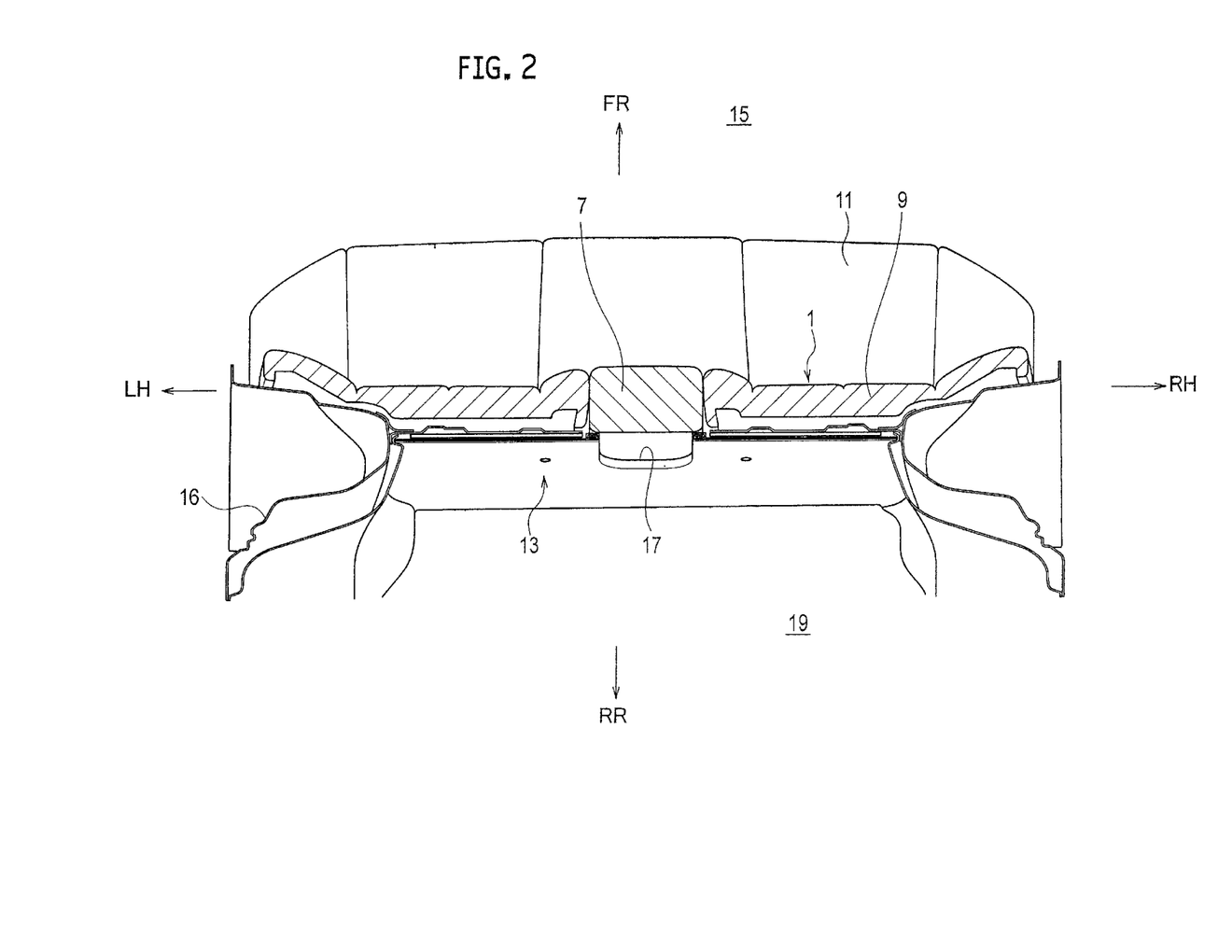
FIG. 2 is a cross-sectional view taken along line A-A in FIG. 1.
Figure 3:
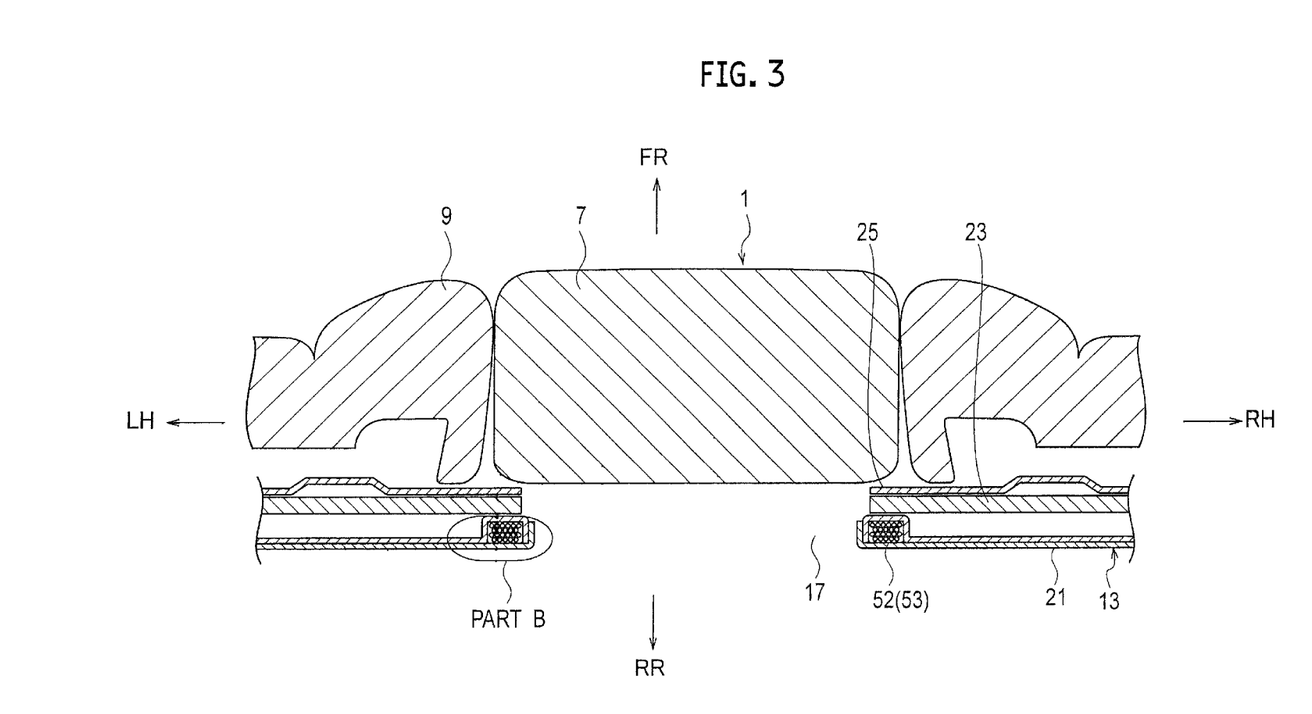
FIG. 3 is an enlarged cross-sectional view of a main part of FIG. 2.

As illustrated in FIGS. 1 to 3, in the rear of a vehicle inside a vehicle compartment, a rear seat 1 is provided along the vehicle width direction. The rear seat 1 includes a left-side seat 3 and a right-side seat 5 which are respectively disposed on the left side and the right side in the vehicle width direction. An armrest 7 is provided between the left-side seat 3 and the right-side seat 5. The left-side seat 3 and the right-side seat 5 each include seat back 9 and a seat cushion 11. In addition, the armrest 7 is sandwiched between the seatback 9 of the left-side seat 3 and the seatback 9 of the right-side seat 5 in a normal state, and closes an opening portion 17 of a seat back panel unit 13 to be described later. Note that the armrest 7 is pivotally supported on a lower portion thereof, and becomes in a use state when pulled forward. In the use state, the opening portion 17 of the seat back panel unit 13 is exposed, and communication is established between a vehicle compartment 15 and a trunk 19 through the opening portion 17. Furthermore, a pair of right and left wheelhouses 16 are provided on both ends in the vehicle width direction of the rear side of the rear seat 1. Incidentally, baggage 20 is loaded onto the trunk 19.

Additionally, as illustrated in FIGS. 1 to 3, the seat back panel unit 13 is disposed along the vehicle width direction near a rear surface of the seatback 9 of the rear seat 1. In such a manner, the seat back panel unit 13 is disposed between the vehicle compartment 15 and the trunk 19.

Here, as illustrated in FIG. 3, the seat back panel unit 13 includes a seat back panel (seat back panel for a vehicle) 21 disposed on the rearmost side, a cushion material 23 disposed on the front side of the seat back panel 21, and a reinforcement panel 25 disposed on the front side of the cushion material 23. The cushion material 23 is formed from nonwoven fabric or the like, for example. In addition, the reinforcement panel 25 is formed of a steel plate, aluminum or the like. Moreover, since the seat back panel 21, cushion material 23, and the reinforcement panel 25 have opening portions of substantially the same size formed therein, communication is established between the vehicle compartment 15 and the trunk 19 through the opening portion 17 for a pass-through to the trunk when the armrest 7 is pulled to expose the opening portion 17 of the seat back panel unit 13.

Figure 4:
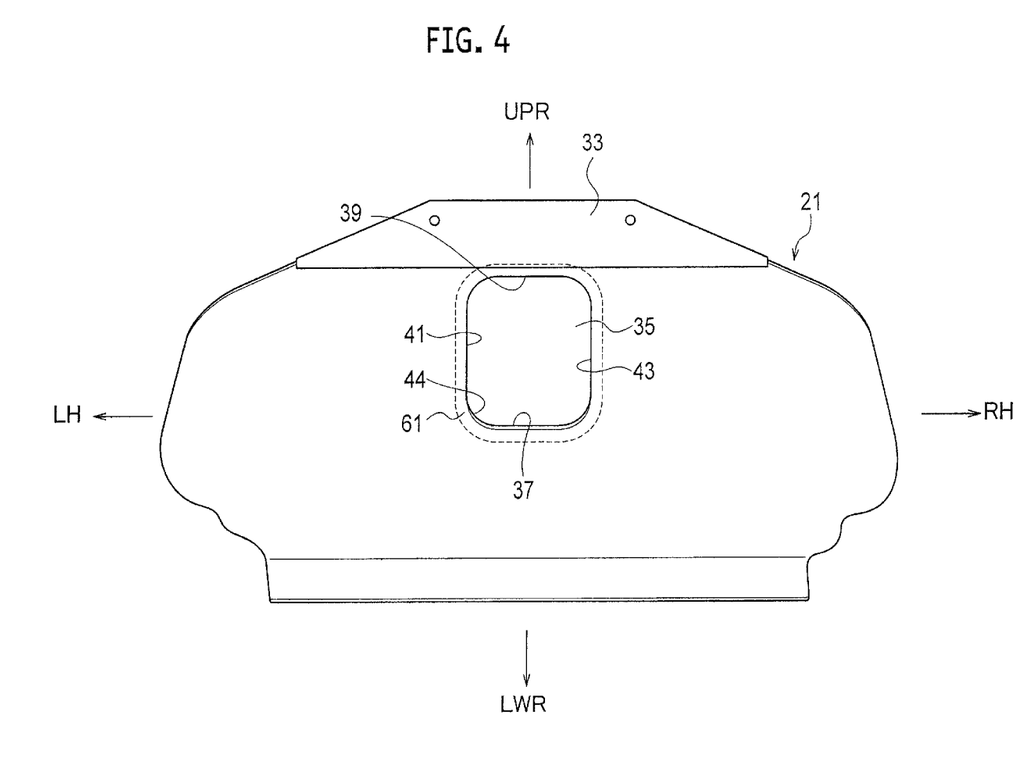
FIG. 4 is a rear view of the seat back panel according to the first embodiment of the present invention, when viewed from the rear side.

Besides, as illustrated in FIG. 1, right and left end portions of the seat back panel 21 are located close to the wheelhouses 16. In other words, a length formed along a right-left direction of the seat back panel 21 is the same as an interval (distance) between the right and left wheelhouses 16, 16. As illustrated in FIG. 4, the seat back panel 21 is formed substantially in the shape of a rectangle in a rear view. On an upper end portion of the seat back panel 21, a shelf portion 31 bent to extend rearward and a vertical wall portion 33 bent from a rear end of the shelf portion 31 to extend upward are provided such that the shelf portion 31 and the vertical wall portion 33 form the L-shape in a side view (see FIG. 1). In addition, in an upper portion of the seat back panel 21, an opening portion 35 formed in a rectangular shape in the rear view is provided at a central portion in the vehicle width direction. A peripheral edge that defines the opening portion 35 includes a lower-side opening edge 37 disposed on the lower side and extending along the vehicle width direction, an upper-side opening edge 39 disposed on the upper side and extending along the vehicle width direction, and a pair of lateral opening edges 41 and 43 connecting, along an up-down direction, ends in the vehicle width direction of the upper-side opening edge 39 to corresponding ends in the vehicle width direction of the lower-side opening edge 37. Note that corner portions 44 on four corners of the peripheral edge of the opening portion 35 are formed in a curved manner in the shape of an arc.

Figure 5:
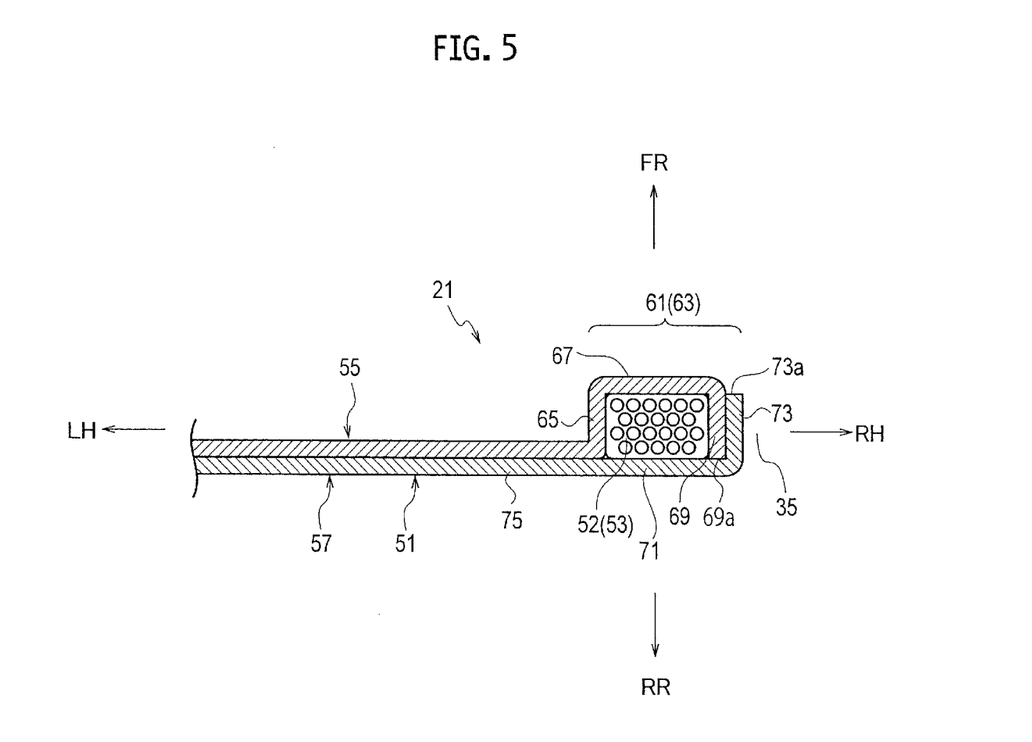
FIG. 5 is an enlarged cross-sectional view of a part B in FIG. 3.

Here, as illustrated in FIG. 5, the seat back panel 21 includes a plate-shaped main body 51 and a fiber assembly 53 provided on the plate-shaped main body 51.

The plate-shaped main body 51 includes a first plate member 55 disposed on the front side (the vehicle compartment side), and a second plate member 57 disposed on the rear side (the trunk 19 side) and facing the first plate member 55.

The first plate member 55 is formed of a fiber reinforced member, and a peripheral edge portion 61 of the opening portion 35 is formed on a bulging portion 63 formed to protrude in a convex shape toward the front side (the vehicle compartment side). To be more specific, in the U-shape in a cross section, the bulging portion 63 is formed of: a first lateral surface 65 bent to extend forward; a front surface 67 bent from a front end of the first lateral surface 65 to extend toward the right side in the vehicle width direction (the opening portion 35 side); and a second lateral surface 69 (end portion) bent from a right end in the vehicle width direction of the front surface 67 to extend rearward.

On the other hand, the second plate member 57 is formed of a fiber reinforced member, and the peripheral edge portion 61 of the opening portion 35 includes a rear surface 71 extending toward the right side in the vehicle width direction, and a lateral surface 73 (end portion) bent from an end in the vehicle width direction of the rear surface 71 to extend forward. To be more specific, the second lateral surface 69 as the end portion of the opening portion 35 in the first plate member 55 is bent to the trunk 19 side; thereafter, the lateral surface 73 as the end portion of the opening portion 35 in the second plate member 57 covers the second lateral surface 69 from above (outer side) the second lateral surface 69 of the first plate member 55; and the end portions are joined to each other. Note that the rear surface 71 of the second plate member 57 is formed flush with a surrounding region 75. In other words, the shape in a cross section of the second plate member 57 near the rear surface is formed such that the surrounding region 75 and the rear surface 71 are connected to each other in a straight line. In addition, the fiber assembly 53 formed of multiple fibers 52 is stored inside a hollow portion of a rectangular shape in a cross section, where the hollow portion is enclosed by the bulging portion 63 of the first plate member 55 and the rear surface 71 of the second plate member 57. For the fibers 52, for example, aramid fibers and the like are suitable, which have a high tensile strength and hence are difficult to stretch. As can be understood from above, the fiber assembly 53 is disposed along the peripheral edge portion 61 of the opening portion 35. As illustrated in FIG. 5, an end edge 69a of the end portion of the first plate member 55 and an end edge 73a of the end portion of the second plate member 57 are disposed at positions unable to be seen from the rear of the vehicle.

Possible operations and effects of the first embodiment are described below. However, the first embodiment is not required to achieve one or more of the below operations and effects.

(1) The seat back panel (seat back panel for a vehicle) 21 according to the first embodiment includes: the plate-shaped main body 51 including the first plate member 55 disposed on the vehicle compartment 15 side of the vehicle and the second plate member 57 disposed on the trunk 19 side while facing the first plate member 55, the plate-shaped main body 51 being disposed between the vehicle compartment 15 and the trunk 19; and the fiber assembly 53 housed between the first plate member 55 and the second plate member 57, and including the multiple fibers 52. The opening portion 35 which establishes communication between the vehicle compartment 15 and the trunk 19 is formed in the plate-shaped main body 51, and the fiber assembly 53 is disposed along the peripheral edge portion 61 of the opening portion 35.

As described above, the fiber assembly 53 is disposed along the peripheral edge portion 61 of the opening portion 35 of the seat back panel 21. For this reason, the strength of the peripheral edge portion 61 of the opening portion 35 in the seat back panel 21 is enhanced, and the strength of the entire seat back panel 21 is also enhanced. Thus, when an impact load is inputted due to the collision of the baggage 20 with the seat back panel 21, breakage having the origin at the peripheral edge portion 61 of the opening portion 35 is suppressed. In particular, breakage due to the input of an impact load is reduced, where the impact load is generated in the case when the vehicle suddenly stops and the baggage 20 is moved to collide with the peripheral edge portion 61 of the opening portion 35 in the seat back panel 21.

(2) The rear surface 71 of the peripheral edge portion 61 of the opening portion 35 in the second plate member 57 is formed flush with the surrounding region 75 of the peripheral edge portion 61, and the cross section of the peripheral edge portion 61 of the opening portion 35 in the first plate member 55 is formed in a bulging portion 63 convex toward the vehicle compartment side, and the fiber assembly 53 is housed inside the bulging portion 63.

External appearance is therefore enhanced because the bulging portion 63 is unable to be seen on the peripheral edge portion 61 of the opening portion 35 when the seat back panel 21 is viewed from the trunk 19 side.

(3) The second lateral surface 69 (end portion) of the opening portion 35 in the first plate member 55 is bent to the trunk 19 side; thereafter, the lateral surface 73 (end portion) of the opening portion 35 in the second plate member 57 covers the second lateral surface 69 from the outer side of the end portion of the first plate member 55; and the end portions are joined to each other.

Thus, the end edge 73a of the end portion of the opening portion 35 in the second plate member 57 is disposed in a direction toward the vehicle compartment. External appearance is therefore enhanced because the end edge 69a of the end portion of the first plate member 55 and the end edge 73a of the end portion of the second plate member 57 are unable to be seen when the seat back panel 21 is viewed from the trunk 19 side.

Second Embodiment

Next, a second embodiment of the present invention will be described. Note that the components identical to those of the first embodiment mentioned above are assigned the same reference signs, and the description thereof is omitted.

Figure 6:
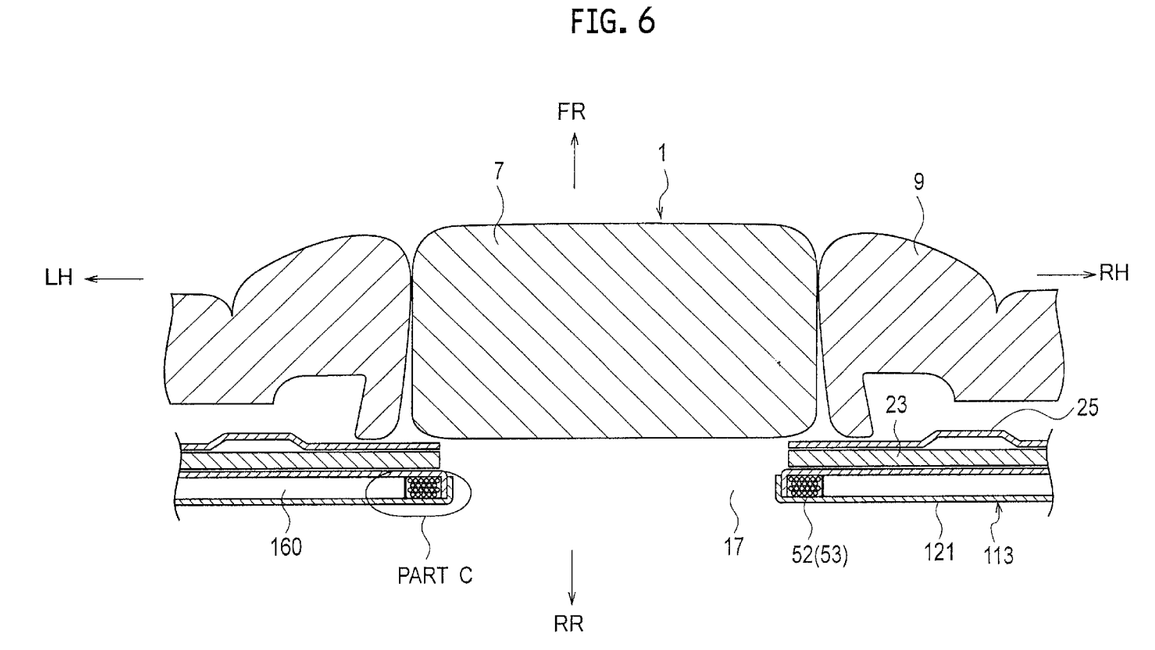
FIG. 6 is a cross-sectional view illustrating a vicinity of a seat back panel according to a second embodiment of the present invention, and corresponds to FIG. 3 according to the first embodiment.

As illustrated in FIG. 6, on the rear surface side of the rear seat 1, a seat back panel unit 113 according to the second embodiment is disposed along the vehicle width direction and near the rear surface of the seatback 9. In the second embodiment, the structure of a seat back panel 121 constituting the seat back panel unit 113 is different from that of the first embodiment.

Figure 7:
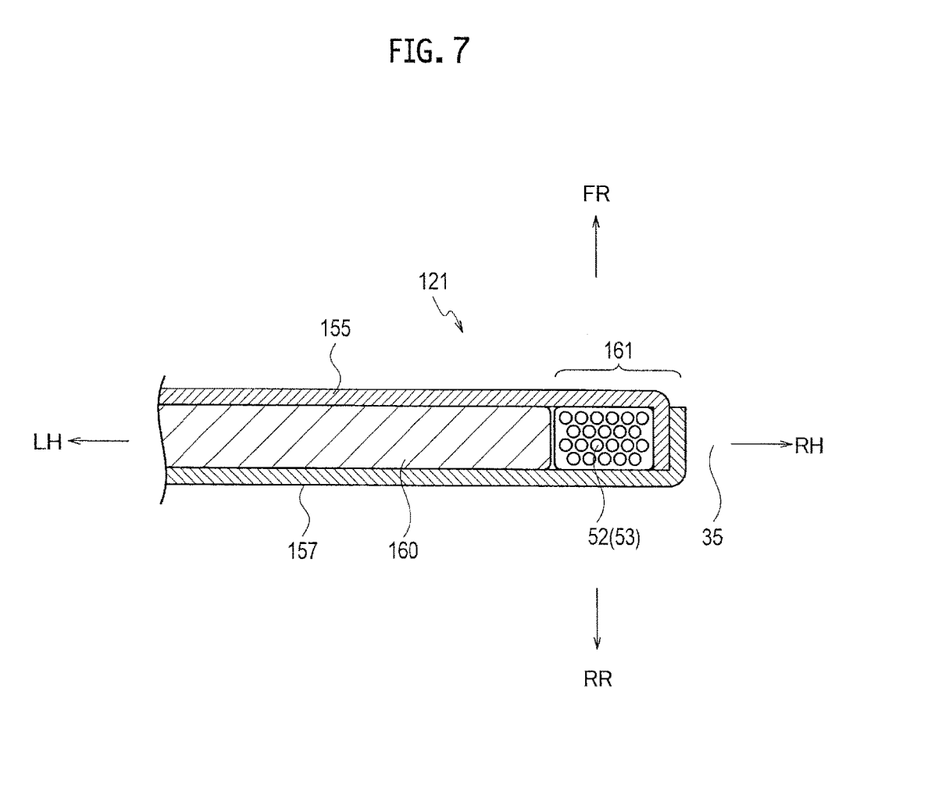
FIG. 7 is an enlarged cross-sectional view of a part C in FIG. 6, and corresponds to FIG. 5 of the first embodiment.

To be more specific, as illustrated in FIG. 7, a space is provided between a first plate member 155 and a second plate member 157, and an intermediate member 160 is interposed in the space. The fiber assembly 53 identical to that of the first embodiment is housed inside a peripheral edge portion 161 of the opening portion 35 of the seat back panel 121, and the plate-shaped intermediate member 160 formed in the same thickness dimension as that of the fiber assembly 53 is provided outside the peripheral edge portion 161. Since the intermediate member 160 and the fiber assembly 53 have the same thickness, no bulging portion 63 is formed as in the first embodiment. Thus, the thickness of the seat back panel itself is formed in the same dimension. Incidentally, nonwoven fabric or the like can be applied to the intermediate member 160, for example.

Possible effects and actions of the second embodiment are described below. However, the second embodiment is not required to achieve one or more of the below operations and effects.

(1) The space is provided between the first plate member 155 and the second plate member 157, and the intermediate member 160 is interposed in the space.

The intermediate member 160 further enhances the strength of the entire seat back panel 121. Thus, when an impact load is inputted to the seat back panel 121, breakage having the origin at the peripheral edge portion 161 of the opening portion 35 is further suppressed.

Third Embodiment

Next, a third embodiment of the present invention will be described. Note that the components identical to those of the first and the second embodiments mentioned above are assigned the same reference signs, and the description thereof is omitted.

Figure 8:
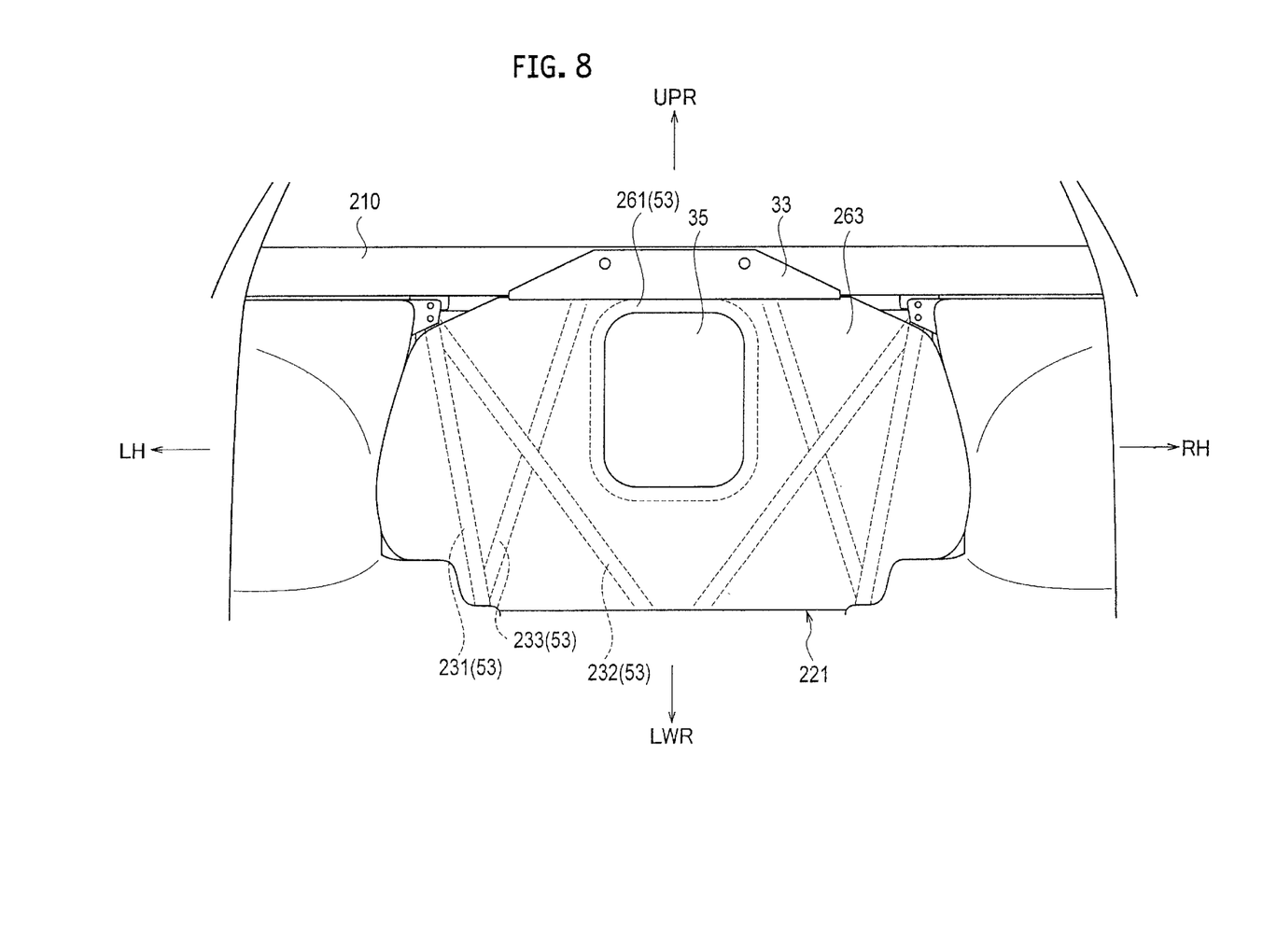
FIG. 8 is a rear view of the vicinity of a seat back panel according to a third embodiment of the present invention, when viewed from the rear side.

As illustrated in FIG. 8, in the third embodiment, the fiber collected bodies 53 are provided in a peripheral edge portion 261 of the opening portion 35 in a seat back panel 221 and in a general portion 263 other than the peripheral edge portion 261.

A support body 210 extends along the vehicle width direction to connect the right and left wheelhouses. The vertical wall portion 33 is formed on an upper end portion of the seat back panel 221, and is fastened to the support body 210 with bolts.

The portion other than the peripheral edge portion 261 of the opening portion 35 in the seat back panel 221 is formed on the general portion 263, and six fiber collected bodies 53 in total are provided symmetrically in the general portion 263. In other words, three fiber collected bodies 53 are disposed on each side of the central portion in the vehicle width direction: namely, a first fiber assembly 231 disposed on the end portion side in the vehicle width direction and extending along the up-down direction; a second fiber assembly 232 extending obliquely downward while approaching the center side in the vehicle width direction; and a third fiber assembly 233 extending obliquely downward while approaching the outer side in the vehicle width direction. An upper end of the first fiber assembly 231 and an upper end of the second fiber assembly 232 are disposed to overlap each other. A lower end of the first fiber assembly 231 and a lower end of the third fiber assembly 233 are disposed to overlap each other. Moreover, the second fiber assembly 232 and the third fiber assembly 233 are disposed to cross each other.

Next, possible effects and actions of the third embodiment are described. However, the third embodiment is not required to achieve one or more of the below operations and effects.

(1) The first to third fiber collected bodies 231, 232, and 233 (fiber collected bodies 53) are provided in the general portion 263 of the seat back panel 221 other than the peripheral edge portion 261 of the opening portion 35.

The strength of the entire seat back panel 221 is increased by providing the fiber collected bodies 53 in the general portion 263. Thus, additional reinforcement members (for example, the cushion material 23 and the reinforcement panel 25 in FIGS. 3 and 6) for reinforcing the seat back panel 221 can be removed, and it is thereby possible to achieve reduction of the weight and the costs of the vehicle.

Embodiments of the present invention have been described above. It should be noted that these embodiments are mere examples described to facilitate the understanding of the present invention, and the present invention is not limited to the above embodiments. The technical scope of the present invention includes not only specific technical matters disclosed in the embodiments, but also various modifications, alterations, alternative techniques and the like that can easily be derived therefrom.

A seat back panel according to one or more embodiments of the present invention is provided between a vehicle compartment and a trunk of a vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 15 vehicle compartment
19 trunk
21 seat back panel (seat back panel for a vehicle)
35 opening portion
51 plate-shaped main body
52 fiber
53 fiber assembly
55 first plate member
57 second plate member
61 peripheral edge portion
63 bulging portion
75 surrounding region
121 seat back panel (seat back panel for a vehicle)
155 first plate member
157 second plate member 160 intermediate member
161 peripheral edge portion
221 seat back panel (seat back panel for a vehicle)
231 first fiber assembly (fiber assembly)
232 second fiber assembly (fiber assembly)
233 third fiber assembly (fiber assembly)
261 peripheral edge portion
263 general portion

The invention claimed is:

1. A seat back panel for a vehicle comprising:
   a plate-shaped main body disposed between a vehicle compartment and a trunk, and comprising:
      a first plate member disposed on a vehicle compartment side of the vehicle, and
      a second plate member disposed on a trunk side while facing the first plate member; and
   a fiber assembly comprising a plurality of fibers housed between the first plate member and the second plate member,
   wherein an opening portion which establishes communication between the vehicle compartment and the trunk is formed in the plate-shaped main body,
   wherein the fiber assembly comprises a first fiber assembly that is disposed along a peripheral edge portion of the opening portion,
   wherein a space is provided between the first plate member and the second plate member, and
   wherein an intermediate member is interposed in the space.

2. The seat back panel for a vehicle according to claim 1, wherein an end portion of the opening portion in the first plate member is bent to the trunk side, thereafter an outer side of an end portion of the first plate member is covered with, and joined to, an end portion of the opening portion in the second plate member.

3. The seat back panel for a vehicle according to claim 1, wherein the fiber assembly comprises a second fiber assembly that is provided in a general portion of the plate-shaped main body other than the peripheral edge portion of the opening portion.

4. The seat back panel for a vehicle according to claim 2, wherein the fiber assembly comprises a second fiber assembly that is provided in a general portion of the plate-shaped main body other than the peripheral edge portion of the opening portion.

* * * * *